(12) United States Patent
Earl et al.

(10) Patent No.: US 8,429,716 B2
(45) Date of Patent: Apr. 23, 2013

(54) SYSTEM AND METHOD FOR TRANSPARENT ACCESS AND MANAGEMENT OF USER ACCESSIBLE CLOUD ASSETS

(75) Inventors: Doug Earl, Orem, UT (US); Lloyd Leon Burch, Payson, UT (US); Carolyn Bennion McClain, Springville, UT (US); Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 654 days.

(21) Appl. No.: 12/613,077

(22) Filed: Nov. 5, 2009

(65) Prior Publication Data

US 2011/0107398 A1  May 5, 2011

(51) Int. Cl.
*H04L 29/06* (2006.01)
(52) U.S. Cl.
USPC .................................................. 726/3
(58) Field of Classification Search ........................ None
See application file for complete search history.

(56) References Cited

U.S. PATENT DOCUMENTS

| | | | |
|---|---|---|---|
| 5,428,738 A | 6/1995 | Carter et al. | |
| 5,787,175 A | 7/1998 | Carter | |
| 5,870,564 A | 2/1999 | Jensen et al. | |
| 5,878,419 A | 3/1999 | Carter | |
| 6,067,572 A | 5/2000 | Jensen et al. | |
| 6,108,619 A | 8/2000 | Carter et al. | |
| 6,119,230 A | 9/2000 | Carter | |
| 6,185,612 B1 | 2/2001 | Jensen et al. | |
| 6,219,652 B1 | 4/2001 | Carter et al. | |
| 6,275,819 B1 | 8/2001 | Carter | |
| 6,405,199 B1 | 6/2002 | Carter et al. | |
| 6,459,809 B1 | 10/2002 | Jensen et al. | |
| 6,601,171 B1 | 7/2003 | Carter et al. | |
| 6,647,408 B1 | 11/2003 | Ricart et al. | |
| 6,650,777 B1 | 11/2003 | Jensen et al. | |
| 6,697,497 B1 | 2/2004 | Jensen et al. | |
| 6,738,907 B1 | 5/2004 | Carter | |
| 6,742,035 B1 | 5/2004 | Zayas et al. | |
| 6,742,114 B1 | 5/2004 | Carter et al. | |
| 6,760,843 B1 | 7/2004 | Carter | |
| 6,772,214 B1 | 8/2004 | McClain et al. | |
| 6,826,557 B1 | 11/2004 | Carter et al. | |
| 6,862,606 B1 | 3/2005 | Major et al. | |
| 6,993,508 B1* | 1/2006 | Major et al. | 705/51 |
| 7,043,555 B1 | 5/2006 | McClain et al. | |
| 7,152,031 B1 | 12/2006 | Jensen et al. | |
| 7,177,922 B1 | 2/2007 | Carter et al. | |
| 7,185,047 B1 | 2/2007 | Bate et al. | |
| 7,197,451 B1 | 3/2007 | Carter et al. | |
| 7,286,977 B1 | 10/2007 | Carter et al. | |
| 7,299,493 B1 | 11/2007 | Burch et al. | |
| 7,316,027 B2 | 1/2008 | Burch et al. | |
| 7,334,257 B1 | 2/2008 | Ebrahimi et al. | |
| 7,356,819 B1 | 4/2008 | Ricart et al. | |
| 7,363,577 B2 | 4/2008 | Kinser et al. | |

(Continued)

*Primary Examiner* — Brandon Hoffman
(74) *Attorney, Agent, or Firm* — Haynes and Boone, LLP

(57) ABSTRACT

System and method for enabling user access of cloud assets are described. In one embodiment, a method comprises authenticating a user to a system comprising a cloud computing environment in which a plurality of cloud assets are hosted; assembling a deployment associated with the authenticated user in accordance with a policy, the deployment comprising designated ones of the cloud assets; and providing a secure mechanism by which the designated ones of the cloud assets comprising the deployment are accessible by the authenticated user.

20 Claims, 4 Drawing Sheets

U.S. PATENT DOCUMENTS

| | | |
|---|---|---|
| 7,376,134 B2 | 5/2008 | Carter et al. |
| 7,386,514 B2 | 6/2008 | Major et al. |
| 7,389,225 B1 | 6/2008 | Jensen et al. |
| 7,426,516 B1 | 9/2008 | Ackerman et al. |
| 7,467,415 B2 | 12/2008 | Carter |
| 7,475,008 B2 | 1/2009 | Jensen et al. |
| 7,505,972 B1 | 3/2009 | Wootton et al. |
| 7,506,055 B2 | 3/2009 | McClain et al. |
| 7,552,468 B2 | 6/2009 | Burch et al. |
| 7,562,011 B2 | 7/2009 | Carter et al. |
| 7,606,229 B1 * | 10/2009 | Foschiano et al. ............ 370/392 |
| 8,214,653 B1 * | 7/2012 | Marr et al. ..................... 713/189 |
| 2008/0244575 A1 | 10/2008 | Carter et al. |
| 2008/0256535 A1 | 10/2008 | Carter et al. |
| 2008/0256538 A1 | 10/2008 | Carter et al. |
| 2008/0307415 A1 | 12/2008 | Carter |

* cited by examiner

SYSTEM AND METHOD FOR TRANSPARENT ACCESS AND MANAGEMENT OF USER ACCESSIBLE CLOUD ASSETS

CROSS-REFERENCE TO RELATED APPLICATIONS

This application claims the benefit under Title 35, United States Code §119(e) of U.S. Provisional Patent Application No. 61/160,038 filed on Mar. 13, 2009, the disclosure of which is incorporated herein by reference in its entirety. This application is related to the following commonly-assigned, co-pending applications, each of which is also incorporated herein by reference in its entirety:

1. U.S. patent application Ser. No. 12/612,807 filed on Nov. 5, 2009, now U.S. Pat. No. 8,065,395 issued on Nov. 22, 2011;
2. U.S. patent application Ser. No. 12/612,818 filed on Nov. 5, 2009;
3. U.S. patent application Ser. No. 12/612,834 filed on Nov. 5, 2009;
4. U.S. patent application Ser. No. 12/612,841 filed on Nov. 5, 2009;
5. U.S. patent application Ser. No. 12/612,882 filed on Nov. 5, 2009;
6. U.S. patent application Ser. No. 12/612,895 filed on Nov. 5, 2009;
7. U.S. patent application Ser. No. 12/612,903 filed on Nov. 5, 2009;
8. U.S. patent application Ser. No. 12/612,925 filed on Nov. 5, 2009;
9. U.S. patent application Ser. No. 12/613,098 filed on Nov. 5, 2009;
10. U.S. patent application Ser. No. 12/613,112 filed on Nov. 5, 2009; and
11. U.S. patent application Ser. No. 12/197,833 filed on Aug. 25, 2008, now U.S. Pat. No. 8,036,396 issued on Oct. 11, 2011.

BACKGROUND

Cloud computing is a type of computing in which dynamically scalable and typically virtualized resources are provided as services via the Internet. As a result, users need not, and typically do not, possess knowledge of, expertise in, or control over the technology and/or infrastructure implemented in the cloud. Cloud computing generally incorporates infrastructure as a service ("IaaS"), platform as a service ("PaaS"), and/or software as a service ("SaaS"). In a typical embodiment, cloud computing services provide common applications online, which applications are accessed using a web browser and the software and data for which are stored on servers comprising the cloud.

Cloud computing customers typically do not own or possess the physical infrastructure that hosts their software platform; rather, the infrastructure is leased in some manner from a third-party provider. Cloud computing customers can avoid capital expenditures by paying a provider for only what they use on a utility, or resources consumed, basis or a subscription, or time-based, basis, for example. Sharing computing power and/or storage capacity among multiple lessees has many advantages, including improved utilization rates and an increase in overall computer usage.

The Internet is rapidly spawning a host of "cloud providers" to provide infrastructure, platforms, and software as a service. Cloud providers such as Amazon.com (AWS), GoGrid, Eucalyptus, etc. are providing a host of new opportunities on the Internet but have not worked together to provide a common management nor execution platform.

SUMMARY

One embodiment is a method for facilitating user access of cloud assets. The method comprises authenticating a user to a system comprising a cloud computing environment in which a plurality of cloud assets are hosted; assembling a deployment associated with the authenticated user in accordance with a policy, the deployment comprising designated ones of the cloud assets; and providing a secure mechanism by which the designated ones of the cloud assets comprising the deployment are accessible by the authenticated user.

DETAILED DESCRIPTION

To better illustrate the advantages and features of the embodiments, a particular description of several embodiments will be provided with reference to the attached drawings. These drawings, and other embodiments described herein, only illustrate selected aspects of the embodiments and are not intended to limit the scope thereof. Further, despite reference to specific features illustrated in the example embodiments, it will nevertheless be understood that these features are not essential to all embodiments and no limitation of the scope thereof is thereby intended. Any alterations and further modifications in the described embodiments, and any further applications of the principles of the embodiments as described herein are contemplated as would normally occur to one skilled in the art. Furthermore, some items are shown in a simplified form, and inherently include components that are well known in the art. Further still, some items are illustrated as being in direct connection for the sake of simplicity and clarity. Despite the apparent direct connection, it is understood that such illustration does not preclude the existence of intermediate components not otherwise illustrated.

The embodiments described herein provide a mechanism for allowing enterprises to use resources in a safe fashion without know the underlining topology or structure. The embodiments described herein further provide a mechanism to transparently start, route and secure virtual distributions, or deployments, in the public or private cloud as the user requests access. The embodiments described herein further provide a mechanism to transparently start, route and secure virtual distributions, or deployments, in the public or private cloud as the user authenticates to the system. The embodiments described herein further provide a mechanism to provide a personal computing and/or desktop environment running in a public cloud and to securely link the environment to an identity based client for local function. The embodiments described herein further provide a mechanism to provide a personal computing and/or desktop environment running in a private cloud and to securely link the environment to an identity based client for local function.

Figure 1:
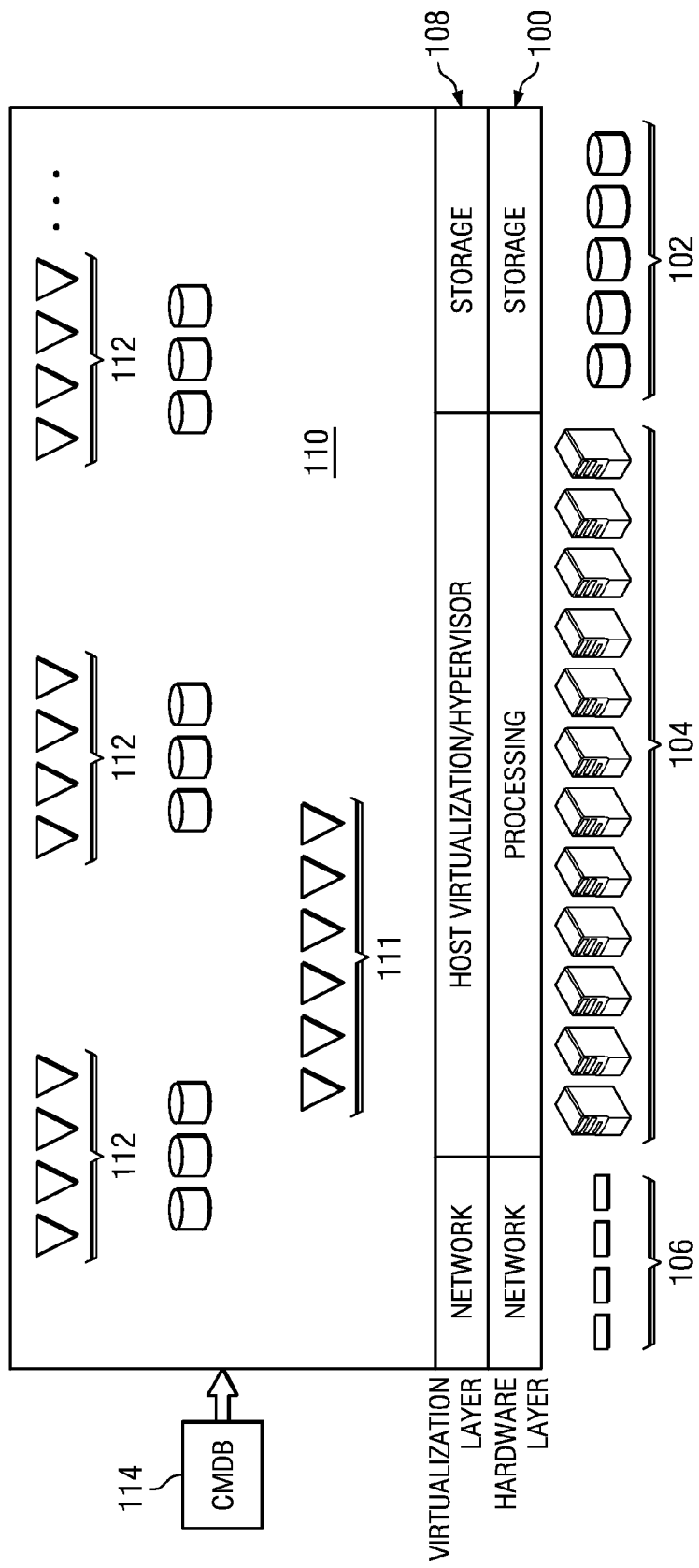
FIG. 1 illustrates an exemplary IaaS cloud structure such as may be implemented in one embodiment.

FIG. 1 illustrates an exemplary IaaS cloud structure. As shown in FIG. 1, the cloud structure includes a hardware layer 100 comprising storage assets 102, processing assets 104, and network assets 106. To facilitate usefulness of the cloud to a variety of enterprises, workloads are sponsored in the cloud as virtual machines possibly accessing virtualized storage and/or virtualized networks. This is accomplished via a virtualization layer 108. Thus, the hardware layer 100 is insulated from the actual workloads to be sponsored in the cloud at a layer 110 by the virtualization layer 108 hardware, storage, and networking so that the operating system selected by the enterprise can be sponsored on whatever hardware the cloud provider makes available. Having established the hardware and virtualization layers 100, 108, the assets 102, 104, and 106 are available in a standardized way to workloads hosted in the workload layer 110, which is the layer the customer typically views as the "cloud". It will be recognized that some of the workloads sponsored in the cloud, specifically, workloads 111, are workloads that are germane to the operation of the cloud and may consist of monitoring processes for enabling the cloud provider to monitor the health of the cloud, management processes to enable the cloud provider to ensure that service-level agreements are enforced, and so on.

Enterprises using the cloud are represented by virtualization processes and storage shown as workloads 112. These processes are typically started by an enterprise via a cloud portal or API utilized by administrative personnel or processes running at the enterprise or in the cloud. A typical cloud provider may be using standard ITIL practices and may utilize a configuration management database ("CMDB") 114, which affects the entire cloud infrastructure and which describes the practice and policies used for instantiating virtualized workloads and storage.

Figure 2:
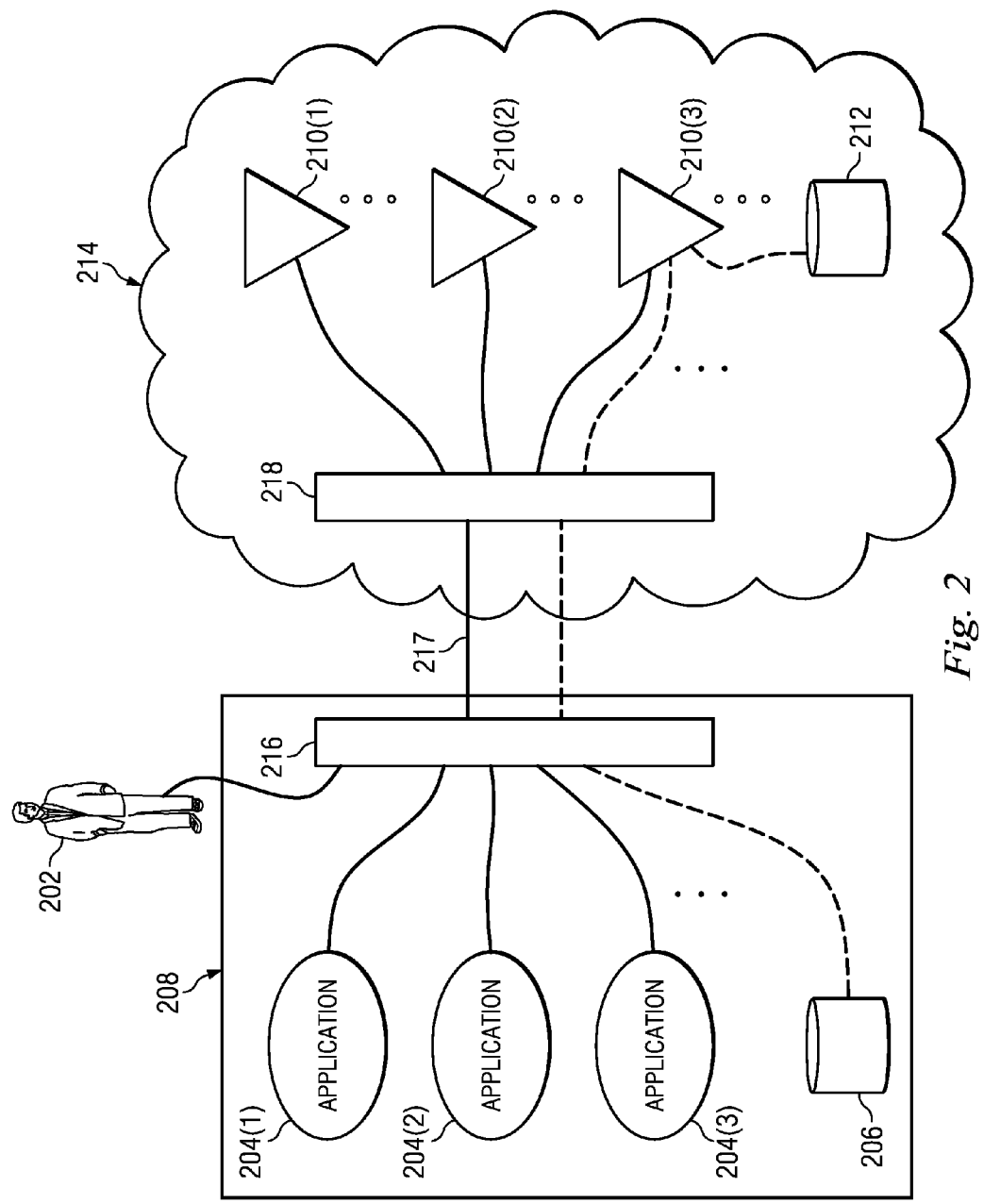
FIG. 2 is a flow diagram of one embodiment of a process for transparent access and management of user accessed cloud assets.

FIG. 2 is a flow diagram of one embodiment of a process for transparent access and management of user accessed cloud assets. In the embodiment illustrated in FIG. 2, it will be assumed that a user 202 desires to access assets 204(1)-204(3), 206, disposed in a private cloud 208 or assets 210(1)-210(3), 212, disposed in a public cloud 214. A secure bridge 216, the operation of which is described in detail in U.S. patent application Ser. No. 12/612,841, which has previously been incorporated by reference, enables authentication of the user 202 and, applying policy defined by the enterprise, uses the information gathered by the secure bridge 216 as a result of the authentication (such as roles, groups, etc.) as arguments to grant the appropriate rights and permission to access the assets 204(1)-204(3) and 206 in the private cloud 208. As also described in the aforementioned patent application, the secure bridge 216 also enables the generation and sharing of cryptographic keys such that the communication between the user 202 and secure bridge 216 and assets 204(1)-204(3) and 206 to be protected. The keys can also be used to encrypt content and data items of the databases 206, 212.

It will be noted that, although the embodiment shown in FIG. 2 comprises a private cloud connected to a public cloud, other arrangements are also possible, including private-to-private, public-to-public, as well as any combination of such arrangements, in which more than two clouds are linked as described.

The authentication mechanisms employed by the secure bridge 216 have been described in the aforementioned patent application. Additionally, a method and mechanism for applying policy to such identity authentication, as well as to the policies stipulated to be used in creating the authentication of and identity, are described in U.S. patent application Ser. No. 12/612,882, which has previously been incorporated by reference. The embodiments described herein provide a fortification channel 217 between the secure bridge 216 and a bridge 218 so that if the cloud assets to be accessed by the user 202 are in a public cloud, such as the cloud 214, the communication channel 217 between the bridges 216, 218, is cryptographically secure.

The embodiments described herein provide for a library of cloud assets, such as virtual machines, such that a request from the user 202 may result in the instantiation of one or more virtual machines 210(1)-210(3). In one embodiment, the virtual machines 210(1)-210(3) may also already be running, in which case the user 202 accesses virtual machines that are already in operation. In another embodiment, there may be some mixture of already running virtual machines and others that need to be instantiated to accomplish the work to be performed.

As disclosed in U.S. patent application Ser. No. 12/612,814, cryptographic mechanisms may be communicated between the bridges 216, 218, such that content stored in the database 212 or the database 206 may be secured from prying eyes and as also disclosed therein, content can be migrated between the databases 206, 212, to effect the best access times according to the workloads that the user 202 is trying to perform. One embodiment also provides for the bridge 218 to apply policy to access requests from either the user 202 or the bridge 216 such that access may be granted or denied based on policy the references in the public cloud 214. Additionally, the bridge 218 may use policy to determine when the unique instantiations of virtual machines, such as the virtual machines 210(1)-210(3), may need to be instantiated and assigned for access to the user 202 despite the fact that instantiations of such virtual machines may already be available. Likewise, policy statements may allow the user 202 to access already instantiated virtual machines in order to collaborate with other users (not shown) that may be communicating with the same instances. One embodiment also provides for either the sharing or full replication or partial replication access to the database 212 as is determined by policy at the bridge 218. The same is true of assets 204(1)-204(3), 206, in the private cloud 208.

Figure 3:
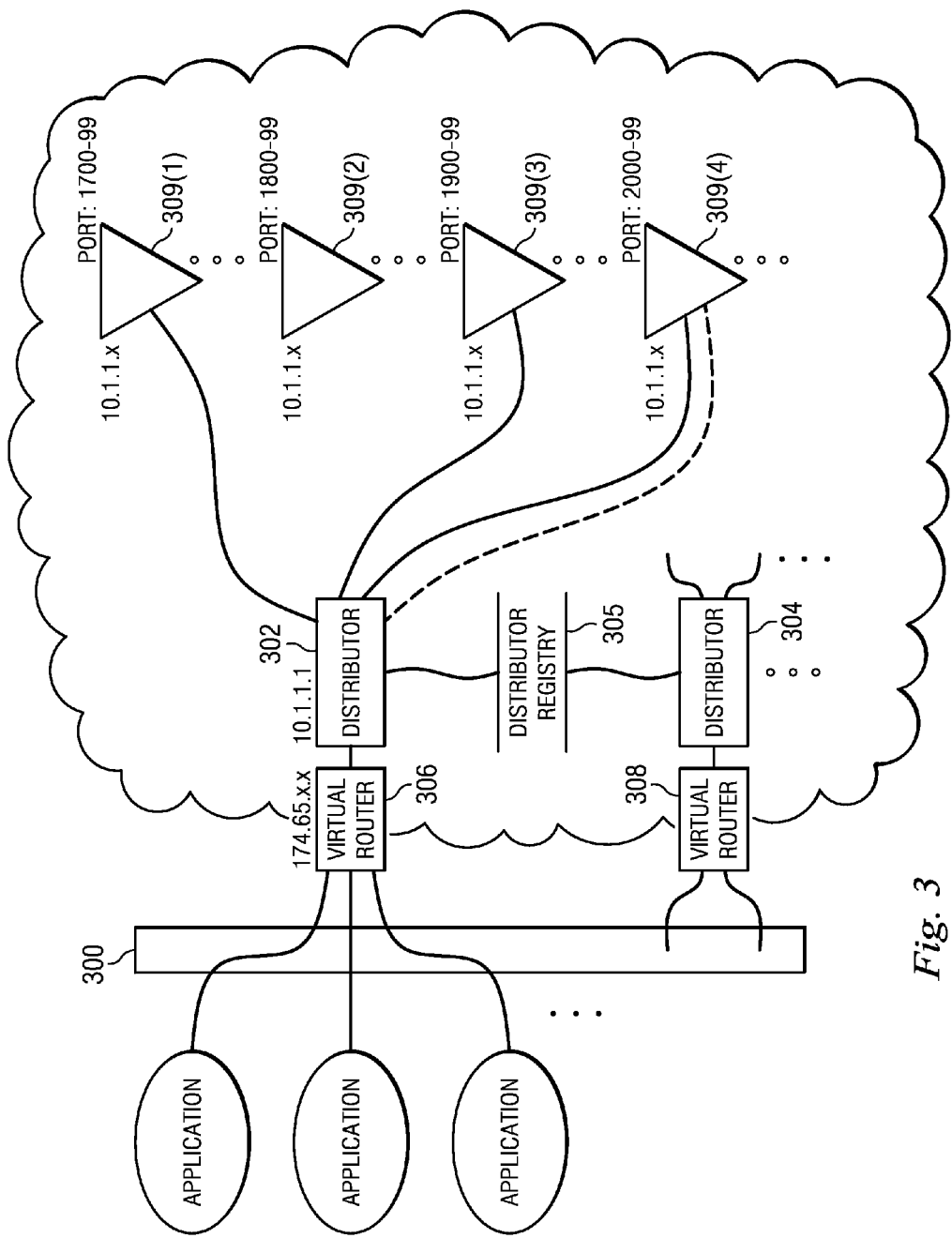
FIG. 3 is a flow diagram of an alternative embodiment of a process for transparent access and management of user accessed cloud assets that provides for the reduction of the use of IP addresses.

One embodiment also provides methods and mechanisms such that once new or shared instantiations of processes or data are provided in the public cloud 214 or private cloud 208 as per policy, the user 202 is granted direct access to those instantiations, either via an IP address or some other access mechanism. As shown in FIG. 3, one embodiment also provides for the reduction of the use of IP addresses, as described in U.S. patent application Ser. No. 12/612,834, which has previously been incorporated by reference. Referring to FIG. 3, a secure bridge 300 provides the same access and process mechanisms as the secure bridge 216 (FIG. 2). Additionally, the bridge 218 (FIG. 2) is represented in FIG. 3 by distributors 302, 304, interconnected via a distributor registry 305, the operation of all of which is described in U.S. patent application Ser. No. 12/612,834. As also noted in the aforementioned patent application, virtual routers 306, 308, provide a NAT for translating a single external address to multiple internal addresses.

The embodiments described herein utilize the mechanisms described hereinabove and in the related applications such that once the functions and features described above are performed to either instantiate new or share previous instantiations of virtual workloads in the public or private cloud, the user 202 (FIG. 2) is granted access to the assets via the NAT (i.e., virtual routers 306, 308) (FIG. 3) in the public or private cloud. It will be noted that all of the functions and/or methods described in connection with FIG. 2 are also present in FIG. 3, which pertains to a library of assets and the instantiation of new or shared processes and/or storage, designated in FIG. 3 by reference numerals 309(1)-309(4). It will be noted that the sharing of cryptographic materials as disclosed in one or more of aforementioned U.S. Patent Applications previously incorporated by reference provide for secure mediation between processes and storage depicted in FIG. 3 and the user 202 (FIG. 2).

Figure 4:
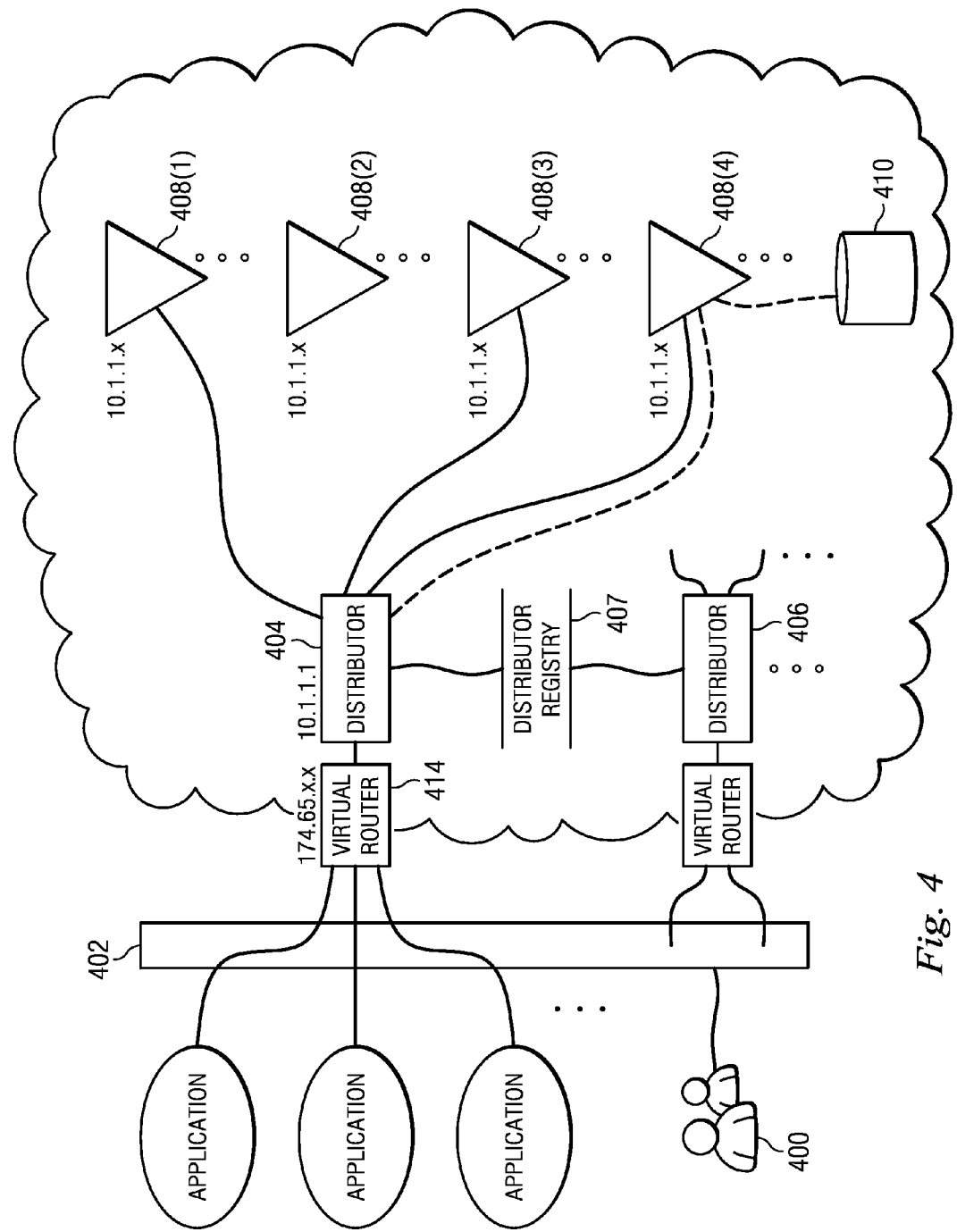
FIG. 4 is a flow diagram of another alternative embodiment of a process for transparent access and management of user accessed cloud assets in which a mechanism is provided for enabling a user to establish an identity with a secure bridge thereof.

As best illustrated in FIG. 4, a mechanism is provided for enabling a user 400 to establish an identity with a secure bridge 402, whereby in accordance with policy, the secure bridge 402 instructs distributors 404, 406, working in conjunction with a distributor registry 407 as previously described, regarding characteristics of one or more virtual deployments (such as compute workloads characterized by the combination of one or more processes 408(1)-408(4) and one or more storage mechanisms 410) necessary to satisfy certain operating requirements of the user 400. The embodiment also provides for the gathering of virtual deployment deposition information from the distributors 404, 406, and distributor registry 407 in order to secure the deployment infrastructure such that the access of the deployment can be secured via a series of key mechanisms, including, but not limited to, generation of a key pair at the bridge 402, whereby the private key is maintained only at the bridge 402 and the public key is populated to the components of the virtual deployment (e.g., processes 408(1)-408(4) and storage 410). The secure bridge 402 also restricts, via policy, the private key association to the selected identity established for the user 400, thus ensuring that only the user 400 may gain access to the deployment.

In one embodiment, the secure bridge 402 may maintain a relationship with the distributors 404, 406, such that additional resources required for scaling the deployment may be bound to the user 400 and the appropriate security policies put into place to ensure that any new workloads generated for the deployment are also only accessible to the user 400. In one embodiment, the secure bridge 402 handles deployment termination requests received from either the user or one or more deployment components. Termination requests prompt the user 400 to direct the clearing of sensitive information from the deployment according to policy and then to proceed via directing the distributors 404, 406, to close out the deployment, returning the processes 408(1)-408(4) to the available component library maintained by the distributors 404, 406.

In one embodiment, termination of the deployment may also be initiated by the secure bridge 402 in reaction to policy and/or threat intrusion detection as outlined in U.S. patent application Ser. No. 12/612,903, which has previously been incorporated by reference. In an embodiment, the distributors 404, 406, may utilize mechanisms for handling TesselApps, as described in U.S. Patent Publication Nos. 2008/0256535, 2008/0244575, 2008/0307415, and 2008/0256538, which are hereby incorporated by reference in their entireties, for a user environment during the process of deployment creation. In an embodiment, the distributors 404, 406, are used merely for the initiation and termination of the deployment components. Once the deployment is in place and secured, the secure bridge 402 directs access to the deployment via virtual router infrastructure 414.

It will be recognized that various ones of the elements, mechanisms, and/or modules described herein may be implemented using one or more general purpose computers or portions thereof executing software applications designed to perform the functions described or using one or more special purpose computers or portions thereof configured to perform the functions described. The software applications may comprise computer-executable instructions stored on computer-readable media. Additionally, repositories described herein may be implemented using databases or other appropriate storage media.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A method for facilitating user access of cloud assets, the method comprising:
   authenticating a user to a system comprising a cloud computing environment in which a plurality of cloud assets are hosted, wherein authenticating the user includes authenticating the user to a secure bridge that interconnects the user to at least one cloud asset of the plurality of cloud assets through a routing system including a virtual router and a distributor connected to the virtual router disposed within the cloud computing environment;
   assembling a deployment associated with the authenticated user in accordance with a policy, the deployment comprising designated ones of the cloud assets; and
   providing a secure mechanism by which the designated ones of the cloud assets comprising the deployment are accessible by the authenticated user, wherein providing the secure mechanism includes generating a key pair at the secure bridge such that the authenticated user thereby obtains access to the designated ones of the cloud assets comprising the deployment through the virtual router of the routing system within the cloud computing environment.

2. The method of claim 1 wherein the policy is defined by an enterprise of which the authenticated user is a member.

3. The method of claim 1 wherein at least one of the designated cloud assets is a shared asset.

4. The method of claim 1 wherein at least one of the designated cloud assets is already instantiated at a time of the assembling.

5. The method of claim 1 wherein the assembling comprises instantiating at least one of the designated cloud assets.

6. The method of claim 1 further comprising terminating the deployment responsive to a termination request received from one of the authenticated users and one of the designated cloud assets.

7. The method of claim 1 wherein the key pair is a public-private key pair and wherein the private key is maintained by the secure bridge and is associated with an ID of the user and the public key is distributed to the designated cloud assets.

8. The method of claim 1 further comprising adding cloud assets to the deployment.

9. The method of claim 1 wherein the virtual router includes a network address translator ("NAT").

10. A system for enabling user access of cloud assets, the system comprising:
- means for authenticating a user to a system comprising a cloud computing environment in which a plurality of cloud assets are hosted, wherein means for authenticating the user includes means for authenticating the user to a secure bridge that interconnects the user to at least one cloud asset of the plurality of cloud assets through a routing system including a virtual router and a distributor connected to the virtual router disposed within the cloud computing environment;
- means for assembling a deployment associated with the authenticated user in accordance with a policy, the deployment comprising designated ones of the cloud assets comprising deployment components; and
- means for providing a secure mechanism by which the designated ones of the cloud assets comprising the deployment are accessible by the authenticated user, wherein means for providing the secure mechanism includes means for generating a key pair at the secure bridge such that the authenticated user thereby obtains access to the designated ones of the cloud assets comprising the deployment through the virtual router of the routing system within the cloud computing environment.

11. The system of claim 10 wherein at least one of the deployment components is a shared asset.

12. The system of claim 10 wherein at least one of the deployment components is already instantiated at a time of the assembling.

13. The system of claim 10 wherein the means for assembling comprises means for instantiating at least one of the deployment components.

14. The system of claim 13 further comprising means for terminating the deployment responsive to a termination request received from one of the authenticated user and one of the deployment components.

15. The system of claim 10 wherein the key pair is a public-private key pair and wherein the private key is maintained by the secure bridge and is associated with an ID of the user and the public key is distributed to the designated cloud assets.

16. The system of claim 10 wherein the virtual router includes a network address translator ("NAT").

17. A system for facilitating user access of cloud assets, the system comprising:
- a first computing environment;
- a second computing environment comprising a cloud computing environment, the second computing environment comprising:
  - a plurality of cloud assets;
  - a routing system including a virtual router and a distributor connected to the virtual router disposed within the cloud computing environment, the routing system providing access to the cloud assets; and
- a secure bridge for interconnecting the first and second computing environments;
- wherein responsive to a user's establishing an identity with the secure bridge, the secure bridge instructs components of the routing system to assemble a deployment comprising selected ones of the cloud assets in accordance with policy and operating requirements of the user and further secures the deployment such that only the user has access thereto through the virtual router of the routing system within the cloud computing environment.

18. The system of claim 17 wherein the secure bridge secures the deployment via a key pair.

19. The system of claim 18 wherein the key pair comprises a public-private key pair, wherein the public key is populated to the selected ones of the cloud assets and the private key is maintained at the secure bridge and wherein association of the private key is restricted to the identity established by the user.

20. The system of claim 17 wherein the virtual router includes a network address translator ("NAT").

* * * * *